US008015485B2

(12) United States Patent
Xing et al.

(10) Patent No.: US 8,015,485 B2
(45) Date of Patent: Sep. 6, 2011

(54) MULTIDIMENSIONAL WEB PAGE RULER

(75) Inventors: Yingxin Xing, Durham, NC (US);
Angela Richards Jones, Durham, NC (US); Henri Fouotsop Meli, Cary, NC (US); Stephanie Lee Walter, Morrisville, NC (US); Tong Yu, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 865 days.

(21) Appl. No.: 11/953,987

(22) Filed: Dec. 11, 2007

(65) Prior Publication Data

US 2009/0150793 A1     Jun. 11, 2009

(51) Int. Cl.
*G06F 17/00* (2006.01)

(52) U.S. Cl. ........ 715/235; 715/236; 715/711; 715/731; 715/763; 715/764; 715/765; 715/775; 715/788; 715/849; 715/859; 715/964

(58) Field of Classification Search .................. 715/764, 715/765, 775, 788, 849, 859, 964, 235, 236, 715/711, 731, 763
See application file for complete search history.

(56) References Cited

U.S. PATENT DOCUMENTS

| | | | | |
|---|---|---|---|---|
| 5,581,670 | A | * | 12/1996 | Bier et al. ...................... 715/856 |
| 5,596,690 | A | * | 1/1997 | Stone et al. ................... 345/630 |
| 5,617,114 | A | * | 4/1997 | Bier et al. ...................... 345/634 |
| 5,798,752 | A | * | 8/1998 | Buxton et al. ................ 715/863 |
| 6,219,070 | B1 | * | 4/2001 | Baker et al. ................... 345/475 |
| 6,988,241 | B1 | * | 1/2006 | Guttman et al. .............. 715/220 |
| 2008/0201118 | A1 | * | 8/2008 | Luo .................................. 703/2 |

OTHER PUBLICATIONS

SGI Company, Alias/Wavefront, Publication date: 1999.*
Robin Rowe, GFX: Alias Wavefront Maya 4, Specialized Systems Consultants, Inc., vol. 2001, Issue 90.*

* cited by examiner

*Primary Examiner* — Dennis-Doon Chow
*Assistant Examiner* — Shen Shiau
(74) *Attorney, Agent, or Firm* — Hamilton & Terrile, LLP; Stephen A. Terrile (57) ABSTRACT

A method, system and computer-usable medium are disclosed for managing the spatial coordinates and visual attributes of objects within a user interface (UI). A Web UI ruler is executed within a UI comprising a plurality of objects. A first object and second object are selected. The Web UI Ruler then collects the spatial coordinate and visual attribute values for the first and second object and their relationship values are determined. The spatial coordinate and visual attribute values for the first and second objects, along with their corresponding relationship values, are modified and the modifications are applied to the target objects. The values are then stored in the Web UI ruler. These values can then be subsequently applied to one or more target objects. Alternatively, the stored values are exported as a cascading style sheet (CSS) class, which can then likewise be subsequently applied to one or more target objects.

17 Claims, 6 Drawing Sheets

MULTIDIMENSIONAL WEB PAGE RULER

BACKGROUND OF THE INVENTION

1. Field of the Invention

Embodiments of the disclosure relate in general to the field of computers and similar technologies, and in particular to software utilized in this field. Still more particularly, it relates to managing the spatial coordinates and visual attributes of objects within a user interface (UI).

2. Description of the Related Art

The World Wide Web (Web) has become an increasingly popular means of delivering content. Web content is typically delivered in the form of Web pages rendered and delivered from a server, such as the WebSphere Application Server from International Business Machines Corporation. In recent years, it has become increasingly popular for Web pages to also be used as the user interface (UI) for software applications. For example, there may be numerous Web pages in an application where an end user must input data, which in turn drives the behavior of the application. Accordingly, when developing such applications, a set of user interface functional requirements must be created to define all of the associated user-specific inputs, functions, outputs and behaviors. These UI functional requirements typically include Graphical User Interface (GUI) functional templates, detailed user interface work products, specifications and supporting documentation.

While detailed functional specifications are often created for each user interface, aggressive production schedules with shifting deadlines and requirements often result in UI design and developer teams negotiating back and forth before reaching agreement on a final design. These negotiations can introduce confusion and ambiguity. As an example, translating design requirements in terms such as "smaller", "bigger" or "5px" into actual implementation changes can often prove challenging for UI developers. This issue is further exacerbated when modifications (e.g., a new field is added) or updates are made to the UI. Additional challenges can arise during unit tests when determining if a modified UI matches its design specification. For example, measuring pixels visually is difficult, and can become even more difficult when the measured object on the page is nested into widgets, tables, frames, images with transparent borders, etc.

Existing Web page design approaches include templates, guidelines, and rulers of different kinds, yet each is proprietary to its corresponding vendor. Furthermore, rulers that can be genetically used in a Web page simply measure the distance between any two points within the UI or provide an indication of scale. None of these are able to determine an object's spatial location coordinates within the UI or its distance from another object. Similarly, none of these are able to access the underlying code of a UI object to determine its attributes, such background color, typeface, and font size. In view of the foregoing, it would be advantageous to have a UI ruler that not only provided measurements of objects within a UI, but also their spatial relationship to each other in quantifiable terms. If would be similarly advantageous to be able to determine an object's visual attributes and how it quantifiably relates to another object.

BRIEF SUMMARY OF THE INVENTION

The present invention includes, but is not limited to, a method, system and computer-usable medium for managing the spatial coordinates and visual attributes of objects within a user interface (UI). In various embodiments, a Web UI ruler is executed within a UI comprising a plurality of objects. A first object is selected with a user gesture, such as a right-mouse-click, followed by the selection of a second object with a similar or like user gesture.

The Web UI Ruler then collects the spatial, coordinate and visual attribute values for the first and second object. As utilized herein, spatial coordinate values quantifiably describe the location of an object within the UI or within another object within the UI (e.g., a table). Similarly, visual attribute values quantifiably describe object attributes such as background color, shading, line weights, and text values such as typefaces, font sizes and colors. Once the spatial coordinate and visual attribute values for the first and second objects are collected, their relationship values are determined. As an example, the left edge of a first and second object may have an alignment difference of 0.2 inch, while the bottom edge of the first object '1' and the top edge of the second object may be determined to be separated by 0.8 inches.

In one embodiment, the spatial coordinate and visual attribute values for the first and second objects, along with their corresponding relationship values, are modified and the modifications are applied to the target objects. In another embodiment, the spatial coordinate and visual attribute values for the first and second objects, along with their corresponding relationship values, are applied to other objects. In yet another embodiment, the spatial coordinate and visual attribute values for the first and second objects, along with their corresponding relationship values, are stored in the Web UI ruler. Once the values are stored, they can subsequently be applied to other objects. In a different embodiment, the stored values are exported as a cascading style sheet (CSS) class, which can then be applied to one or more target objects. By doing so, the target object acquires the same spatial coordinate and visual attribute values, along with their relationship values, as the contributing objects. The above, as well as additional purposes, features, and advantages of the present invention will become apparent in the following detailed written description.

BRIEF DESCRIPTION OF THE DRAWINGS

Selected embodiments of the present invention may be understood, and its numerous objects, features and advantages obtained, when the following detailed description is considered in conjunction with the following drawings, in which.

DETAILED DESCRIPTION

A method, system and computer-usable medium are disclosed for managing the spatial coordinates and visual attributes of objects within a user interface (UI). As will be appreciated by one skilled in the art, the present invention may be embodied as a method, system, or computer program product. Accordingly, embodiments of the invention may be implemented entirely in hardware, entirely in software (including firmware, resident software, micro-code, etc.) or in an embodiment combining software and hardware. These various embodiments may all generally be referred to herein as a "circuit," "module," or "system," Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied, therein, either in baseband or as part of a carrier wave. The computer usable program code may be transmitted using any appropriate medium, including but not limited to the Internet, wireline, optical fiber cable, radio frequency (RF), etc.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the internet using an Internet Service Provider).

Embodiments of the invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Figure 1:
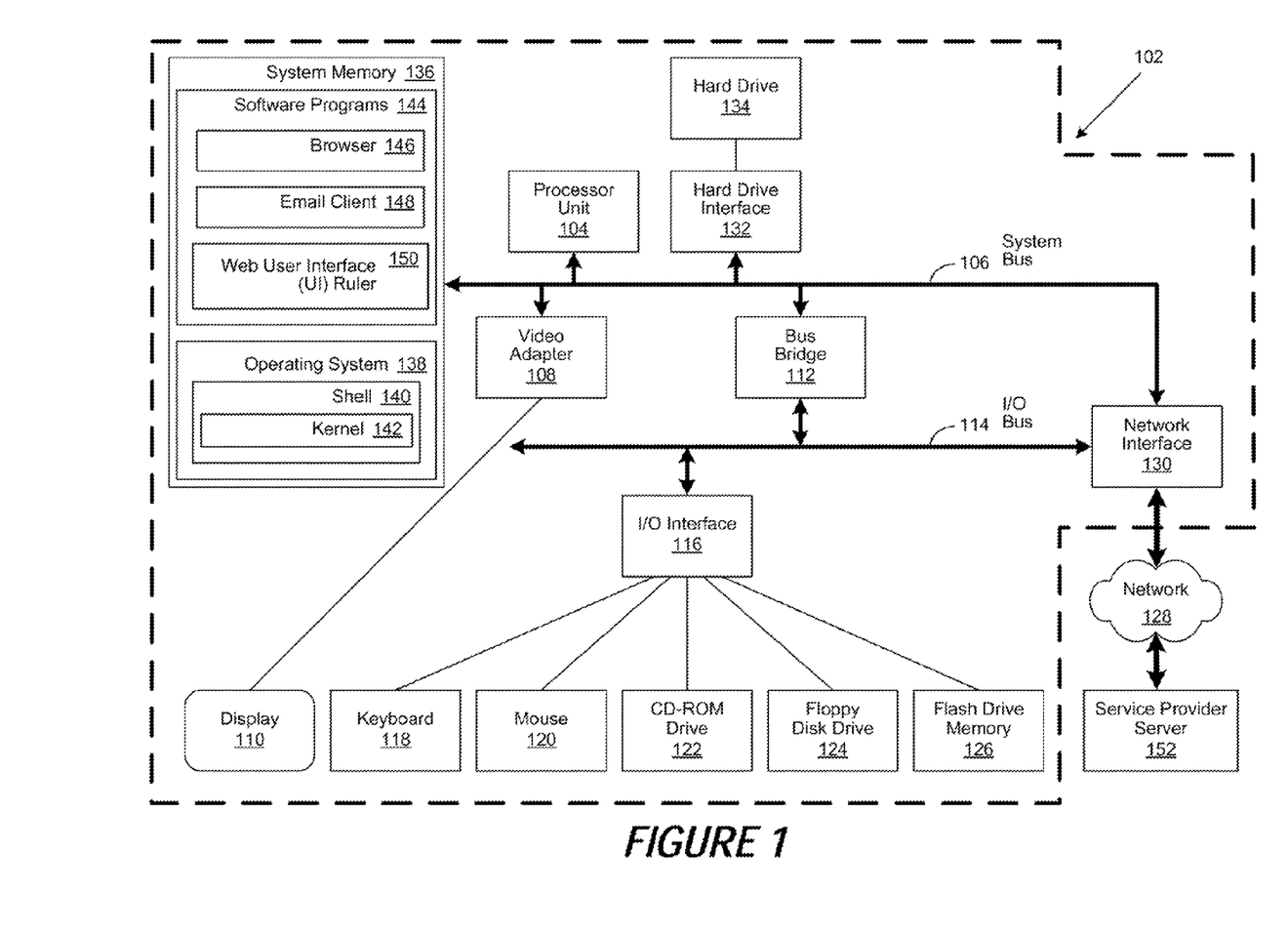
FIG. 1 depicts an exemplary client computer in which the present invention may be implemented.

FIG. 1 is a block diagram of an exemplary client computer 102 in which the present invention may be utilized. Client computer 102 includes a processor unit 104 that is coupled to a system bus 106. A video adapter 108, which controls a display 110, is also coupled to system bus 106. System bus 106 is coupled via a bus bridge 112 to an Input/Output (I/O) bus 114. An I/O interlace 116 is coupled to I/O bus 114. The I/O interface 116 affords communication with various I/O devices, including a keyboard 118, a mouse 120, a Compact Disk-Read Only Memory (CD-ROM) drive 122, a floppy disk drive 124, and a flash drive memory 126. The format of the ports connected to I/O interface 116 may be any known to those skilled in the art of computer architecture, including but not limited to Universal Serial Bus (USB) ports.

Client computer 102 is able to communicate with a service provider server 152 via a network 128 using a network interface 130, which is coupled to system bus 106. Network 128 may be an external network such as the Internet, or an internal network such as an Ethernet Network or a Virtual Private Network (VPN). Using network 128, client computer 102 is able to use the present invention to access service provider server 152.

A hard drive interface 132 is also coupled to system bus 106. Hard drive interface 132 interfaces with a hard drive 134. In a preferred embodiment, hard drive 134 populates a system memory 136, which is also coupled to system bus 106. Data that populates system memory 136 includes the client computer's 102 operating system (OS) 138 and software programs 144.

OS 138 includes a shell 140 for providing transparent user access to resources such as software programs 144. Generally, shell 140 is a program that provides an interpreter and an interface between the user and the operating system. More specifically, shell 140 executes commands that are entered into a command line user interface or from a file. Thus, shell 140 (as it is called in UNIX®), also called a command processor in Windows®, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. While shell 140 generally is a text-based, line-oriented user interface, the present invention can also support other user interlace modes, such as graphical, voice, gestural, etc.

As depicted, OS 138 also includes kernel 142, which includes lower levels of functionality for OS 138, including essential services required by other parts of OS 138 and software programs 144, including memory management, process and task, management, disk management, and mouse and keyboard, management.

Software programs 144 may include a browser 146 and email client 148. Browser 146 includes program modules and instructions enabling a World Wide Web (WWW) client (i.e., client computer 102) to send and receive network messages to the Internet using HyperText Transfer Protocol (HTTP) messaging, thus enabling communication with service provider server 152. Software programs 144 also include a Web user interface (UI) ruler 150. The Web UI ruler 150 includes code for implementing the processes described in FIGS. 2 through 4 described hereinbelow. In one embodiment, client computer 102 is able to download the Web UI ruler 150 from a service provider server 152.

The hardware elements depicted in client computer 102 are not intended to be exhaustive, but rather are representative to highlight components used by the present invention. For instance, client computer 102 may include alternate memory storage devices such as magnetic cassettes. Digital Versatile Disks (DVDs), Bernoulli cartridges, and the like. These and other variations are intended to be within the spirit and scope of the present invention.

Figure 2:
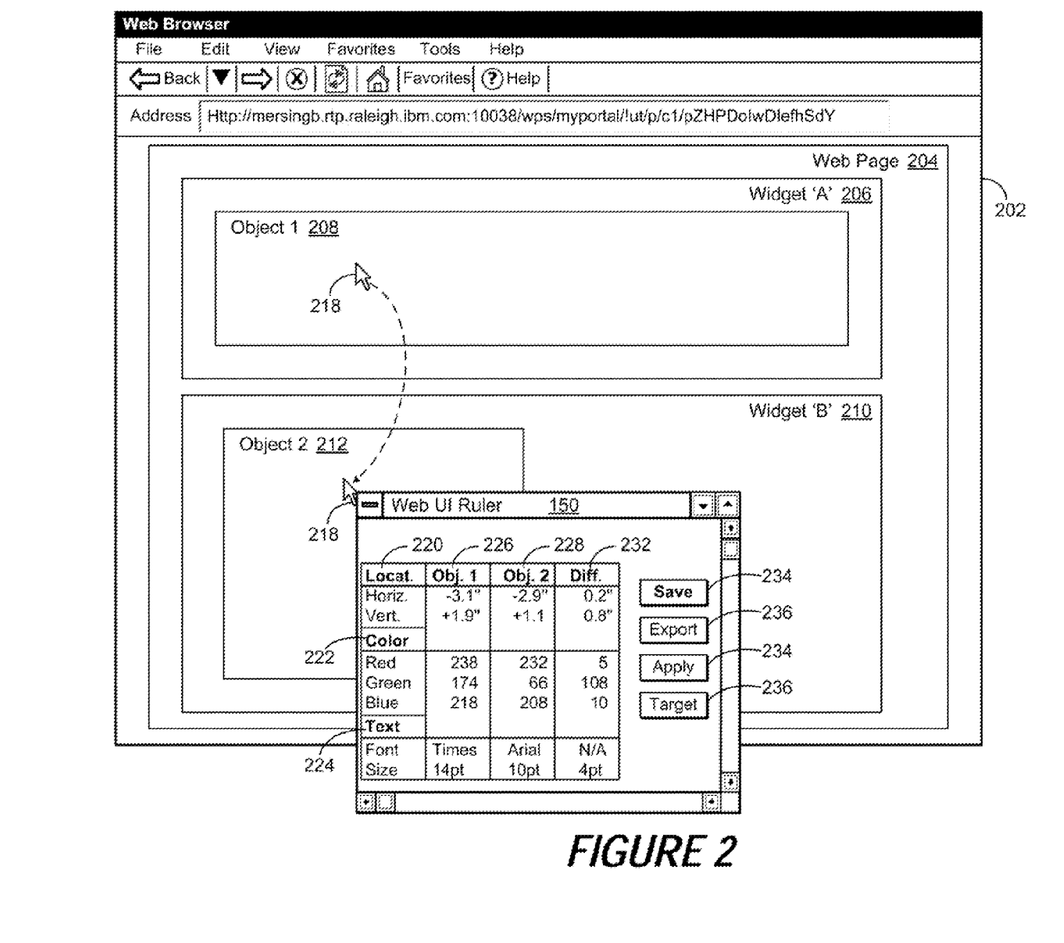
FIG. 2 shows a Web user interface (UI) ruler as used, to determine the spatial and visual relationship of two objects within a user interface (UI)

FIG. 2 shows a Web user interface (UI) ruler as used to determine the spatial and visual relationship of two objects within a user interface (UI). In this embodiment, Web UI ruler operations begin with the loading of a Web page 204 into a UI 202, followed by the activation of a Web UI ruler 150. The Web page 204 comprises widget 'A' 206 and widget 'B' 210, respectively comprising object '1' 208 and object '2' 212. The Web UI ruler 150 comprises spatial coordinate (e.g., location 220) values 226, 226, respectively for object T 208 and object '2' 212, followed by their relationship values 232. Similarly, the Web UI ruler ISO likewise comprises visual attribute (e.g., color 222, text 224) values 226, 226, respectively for object '1' 208 and object '2' 212, followed by their relationship values 232. The Web UI ruler 150 also comprises a 'save' button 234 for saving the displayed values, and an 'export' button 236 for exporting the displayed values, such as to a cascading style sheet (CSS) class, in addition, the Web UI ruler 150 comprises an 'apply' button 234 for applying the displayed values, and a 'target' button 236 for designating a target object when applying the displayed values.

Object '1' 208 within the UI 202 is selected with a user gesture, such as a right-mouse-click with cursor 218, followed by the selection of object '2' 212 with a similar or like user gesture with cursor 218. The Web UI Ruler 150 then collects the spatial coordinate and visual attribute values for object T 208 and object '2' 212. As utilized herein, spatial coordinate values quantifiably describe the location of an object (e.g., object '1' 208 and object '2' 212) within a UI (e.g., UI 202), a window in the UL a table in the UI, another object within the UI, or any related UI structure familiar to those of skill in the art. As an example, the location 220 of a object '1' 208 or object '2' 212 within the UI 202 can be represented as sets of Cartesian 'x', 'y', and V values. As an example, the left, edge of object '1' 208 may be referenced as having a Cartesian value −3.1 inches horizontally and its top edge having a Cartesian value of +4.2 inches vertically. Different units of measure, such as pixels, may be used in different embodiments. Additionally, spatial coordinate values can also be used to reference the layer of an object within the UI. For example, a widget, (e.g., widget 'A' 206, widget 'B' 210) may have a layer value (e.g., Cartesian 'z' value) of 2, while a table (e.g., object '1' 208, object '2' 212) within the widget may have a layer value of 3. Similarly, visual attribute values quantifiably describe object attributes such as background color 222, shading, line weights, and text values 224, such as typefaces, font sizes and colors. Additionally, nested values can be used to enable the Web user interface ruler 150 to resolve nested relationships of objects (e.g., objects that are nested into widgets, tables or frames, etc) within the UI.

Once the spatial coordinate and visual attribute values for object '1' 208 and object '2' 212 are collected, their relationship values are determined. As an example, the left edge of object '1' 208 and of object '2' 212 may have an alignment difference of 0.2 inch, while the bottom edge of object '1' 208 and the top edge of object '2' 212 may be determined to be separated by 0.8 inches. Similarly, object '1' 208 may be populated with text using a Times Roman typeface with a font size of 14 points, while object '2' 212 may be populated with text using an Arial typeface with a font size of 10 points, The spatial coordinate and visual attribute values for object '1' 208 and object '2' 212, along with their relationship values, are then displayed in the Web UI ruler 150.

In one embodiment, the spatial coordinate and visual attribute values 226, 228 for object '1' 208 and object '2' 212, along with their corresponding relationship values 232, are stored in the Web UI ruler 150 through a user gesture, such as a mouse click on the 'save' button 234. In another embodiment, the stored values are exported as a cascading style sheet (CSS) class through a user gesture, such as a mouse click on the 'export' button 236. It will be appreciated that by exporting the current spatial coordinate and visual attribute values, along with their corresponding relationship values, to a CSS class allows the values to be applied to a target object. By doing so, the target object acquires the same spatial coordinate and visual attribute values, along with their relationship values, as the contributing objects. This ability can prove advantageous when multiple objects within the UI 202, such as a column of radio buttons, need to have the same spatial coordinate and visual attribute values.

Figure 3:
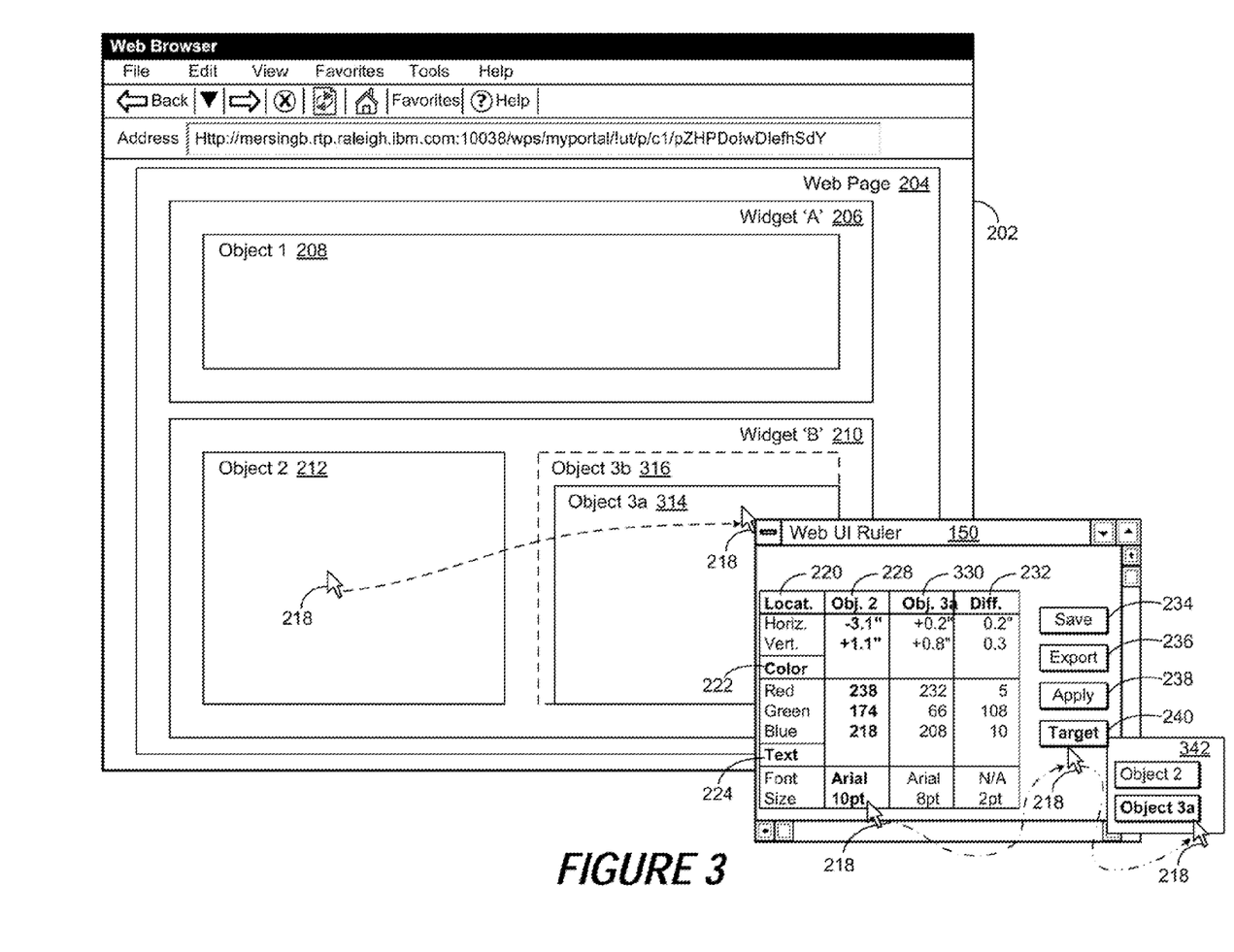
FIG. 3 shows a Web UI ruler as used to transfer the spatial and visual relationship attributes from a first object within a user interface (UI) to a second object.

FIG. 3 shows a Web UI ruler as used to transfer the spatial and visual relationship attributes from a first object within a user interface (UI) to a second object. In this embodiment, Web UI ruler operations begin with, the loading of a Web page 204 into a UI 202, followed by the activation of a Web UI ruler 150. The Web page 204 comprises widget 'A' 206, which, comprises object '1' 208, and widget 'B' 210, which comprises object '2' 212, object '3a' 314, and object. '3b' 316. The Web UI ruler 150 comprises spatial coordinate (e.g., location 220) values 226, 226, respectively for object '1' 208 and object '2' 212, followed by their relationship values 232. Similarly, the Web UI ruler 150 likewise comprises visual attribute (e.g., color 222, text 224) values 226, 226, respectively for object '1' 208 and object '2' 212, followed by their relationship values 232. The Web UI ruler 150 also comprises a 'save' button 234 for saving the displayed values, and an 'export' button 236 for exporting the displayed values, such as to a cascading style sheet (CSS) class. In addition, the Web UI ruler 150 comprises an 'apply' button 234 for applying the displayed values, and a 'target' button 236 for designating a target object when applying the displayed values.

Object '2' 212 within the UI 202 is then selected with a user gesture, such as a right-mouse-click with cursor 218, followed by the selection of object '3a' 314 with a similar or like user gesture with cursor 218. The Web UI Ruler 150 then collects the spatial coordinate and visual attribute values for object '2' 212 and object '3a' 314. Once the spatial coordinate and visual attribute values for object '2' 212 and object '3a' 314 are collected, their relationship values are determined as described in greater detail herein. The spatial coordinate and visual attribute values for object '2' 212 and object '3a' 314, along with their relationship values, are then displayed in the Web UI ruler 150.

The spatial coordinate and visual attribute values for object '2' 212 are then selected through a user gesture, such as a series of mouse clicks, or a mouse click-and-drag to highlight a group of values. The 'target' button 240 is then selected with a similar user gesture such as mouse click, which opens object target menu 342. Object ('3a' 314, is selected as the target object, followed by the selection of 'apply' button 238. The spatial coordinate and visual attribute values for object '2' 212 are then applied to object '3a' 314. As a result, object '3a' 314 is transformed into object '3b' 316, which has the same spatial coordinate and visual attribute values for object '2' 212.

Figure 4A:
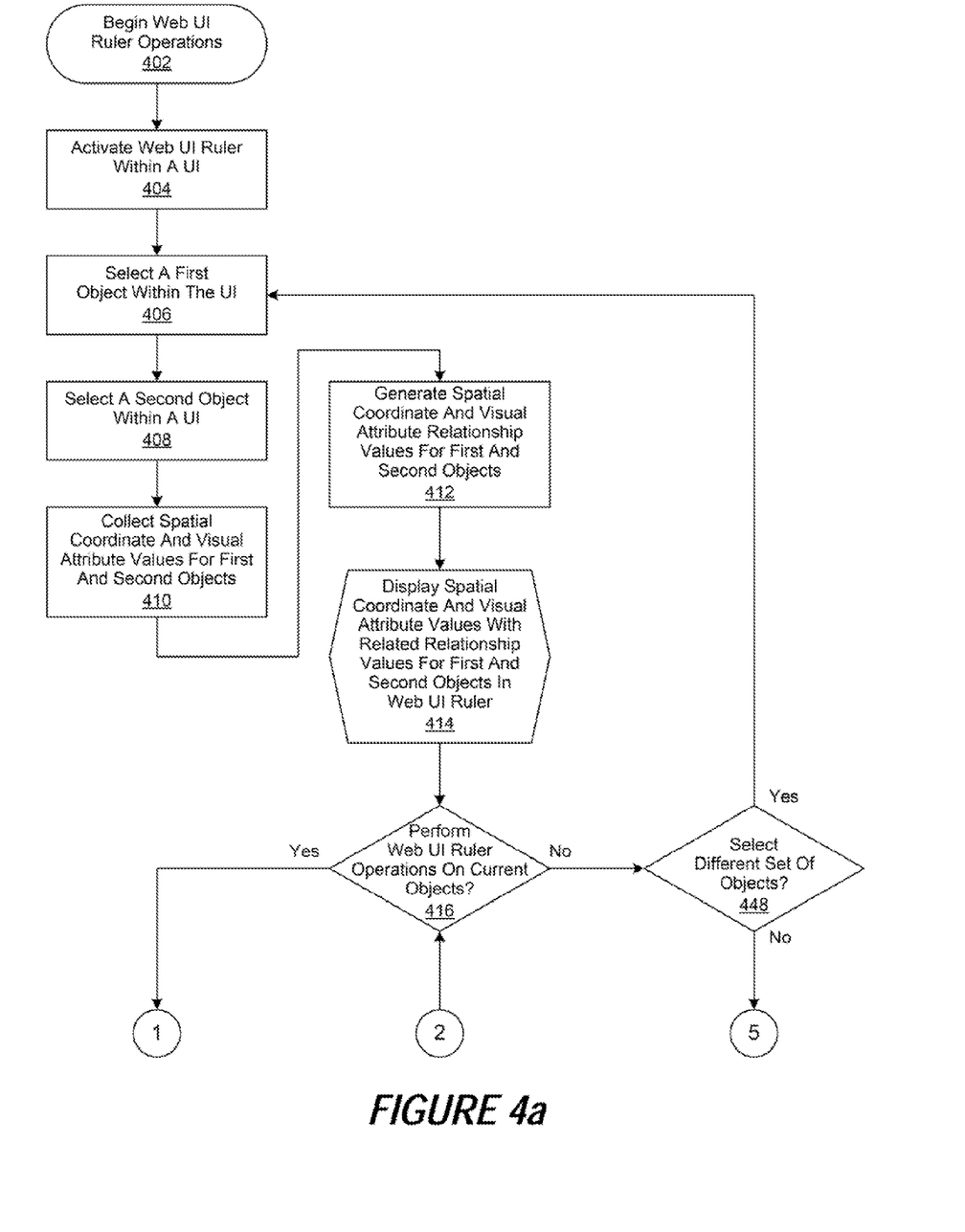
FIGS. 4a-c show a flowchart of the implementation of a Web UI ruler as used to determine the spatial and visual relationship of two objects within a user Interface (UI).
Figure 4B:
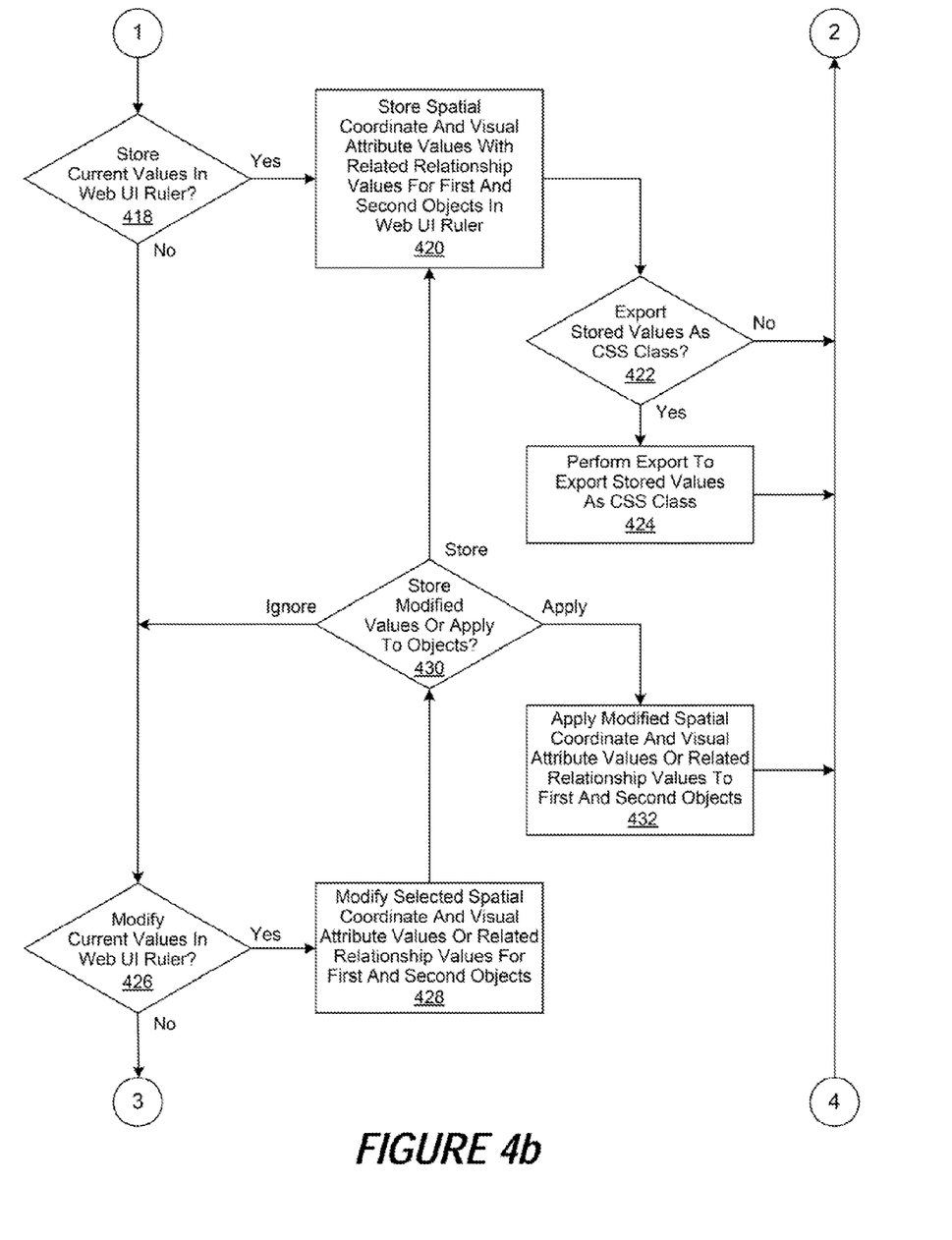
Figure 4C:
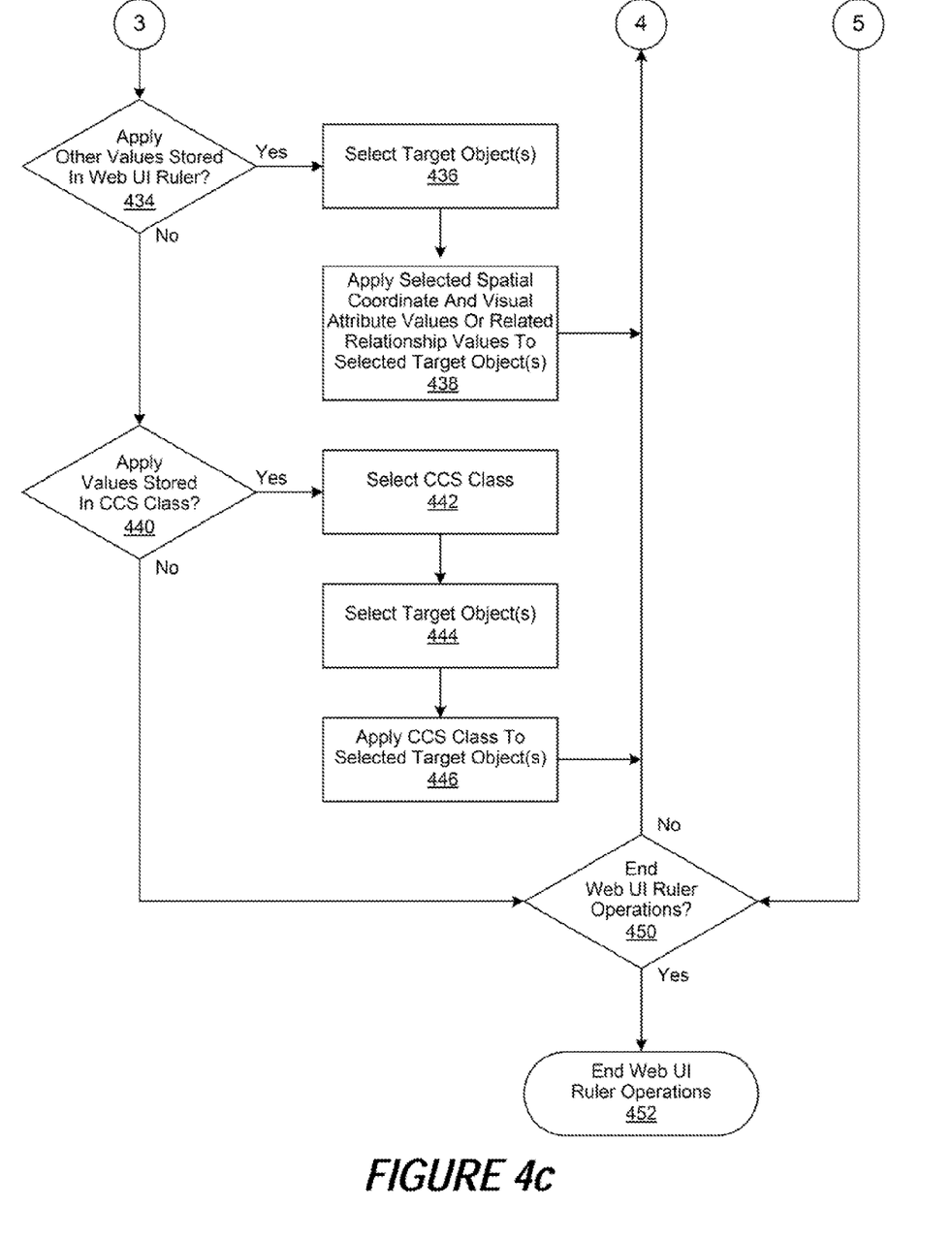

FIG. 4 is a flowchart of the implementation of a Web UI ruler as used in an embodiment of the invention to determine the spatial and visual relationship of two objects within a user interlace (UI). In this embodiment, Web UI ruler operations begin in step 402 with the loading of a Web page into a UI, followed by the activation of a Web UI ruler in step 404. A first object within the UI is selected with a user gesture, such as a right-mouse-click, in step 406, followed by the selection of a second object in the UI in step 408 with a similar or like user gesture. The spatial coordinate and visual attribute values for the selected first and second objects are then collected in step 410. As utilized herein, spatial coordinate values quantifiably describe the location of an object within a UI, a window in the UI, a table in the UI, another object within the UI, or any related UI structure familiar to those of skill in the art. As an example, the location of a selected object within a UI can be represented as sets of Cartesian 'x', 'y', and 'z' values. To further the example, the center of an object may be referenced, as being located +2.25 inches vertically and −2.75 inches from the center of a UI window. As another example, the left edge of an object may be referenced as having a Cartesian value −3.1 inches horizontally and the top edge of the object having a Cartesian, value of +4.2 inches vertically. Different units of measure, such as pixels, may be used in different embodiments. Additionally, spatial coordinate values can also be used to reference the layer of an object within the UI. For example, a widget may have a layer value of 2, while a table within the widget may have a layer value of 3. Similarly, visual attribute values quantifiably describe object attributes such as background color, shading, line weights, and typefaces, font sizes and colors.

Once the spatial coordinate and visual attribute values for the selected first and second objects are then collected, their relationship values are determined. As an example, the left edge of the first and second object may have an alignment difference of 0.1 inch, while the bottom edge of the first object and the top edge of the second object may be determined to be separated by 0.2 inches. Similarly, the first object may be populated with text using a Times Roman typeface with a font size of 14 points, while the second object may be populated with text using an Arial typeface with a font size of 10 points. It will be apparent to skilled practitioners of the art that while it is difficult to quantitatively describe the difference between the use of a Times Roman typeface versus an Arial typeface, the information regarding which object is using which typeface can be of value. Similarly, font sizes, while having different dimensions for different typefaces, are still characterized by their respective point sizes, which can likewise prove useful during the design of a UI. The spatial coordinate and visual attribute values for the selected first and second objects, along with their relationship values, are then displayed in the Web UI ruler in step 414.

A determination is then made in step 416 whether Web UI operations are to be performed on the selected first and second objects. If not, then a determination is made in step 448 whether a different set of objects within the UI are to be selected. If it is determined in step 448 to select a different set of objects, then the process is repeated, beginning with step 406. Otherwise, a determination is made in step 450 whether Web UI ruler operations should be ended. If not, then the process is repeated, beginning with step 416. Otherwise Web UI ruler operations are ended in step 452.

However, if Web UI operations are to be performed, then a determination is made in step 418 whether the current spatial coordinate and visual, attribute values for the selected first and second objects, along with their corresponding relationship values, are to be stored in the Web UI ruler. If so, then the current values are stored in the Web UI ruler in step 420. Then a determination is made in step 422 whether the stored values are to be exported as a cascading style sheet (CSS) class. If so, then the stored values are exported in step 422. Those of skill in the art will appreciate that by exporting the current spatial coordinate and visual attribute values, along with their corresponding relationship values, to a CSS class allows the values to be applied to a target object. By doing so, the target object acquires the same spatial coordinate and visual attribute values, along with their relationship values, as the contributing objects. This ability can prove advantageous when multiple objects within a UI, such as a column of radio buttons, need to have the same spatial coordinate and visual attribute values. Regardless of whether it is determined to not export the current values stored in the Web UI ruler in step 422, or if the current, values are exported in step 424, the process is repeated, beginning with step 416.

However, if a determination is made in step 418 to not store the current values in the Web UI ruler, then a determination is made in step 426 whether to modify the current values in the Web UI ruler. If so, then spatial, coordinate and visual attribute values for the selected first and second objects, or their corresponding relationship values, are selected and modified in step 428. As an example, the first object may be populated with text using a Times Roman typeface with a font size of 14 points, while the second object may be populated with text using an Arial typeface with a font size of 10 points. The visual attribute values for the typeface and font size of the first object can be modified to match that of the second object. Once the modifications are made, they can be applied to the affected objects, saved in the ruler for reuse with other objects, or exported to a cascading style sheet (CSS) class. Accordingly, once the modifications are made, a determination is made in step 430 whether the modifications to current values are to be applied to the affected objects, stored in the Web UI ruler, or ignored. If it is determined in step 431) to save the modified current values in the Web UI ruler, then they are changed in step 420 and the process is repeated beginning with step 420. If it is determined in step 430 to apply the modified current values in the Web UI ruler to the selected first and second objects, then the modifications are applied in step 432 and the process is repeated beginning with step 416. However, if it is determined in step 430 to ignore the modified current values in the Web UI ruler, then they are ignored and the process is repeated beginning with step 426.

A determination is then made in step 434 whether to apply spatial coordinate and visual attribute values, or their corresponding relationship values, that have been previously stored in the Web UI ruler to the selected first and second objects. If so, then the selected spatial coordinate and visual attribute values, or their corresponding relationship values, are applied to a target object. For example, a first object the left edge of the first and second object may have an alignment difference of 0.1 Inch, while the bottom edge of the first object and the top edge of the second object may be determined to be separated by 0.2 inches. Furthermore, the first object may be populated with text using an Arial typeface with a font size of 10 points, while the second object may be populated with text using a Times Roman typeface with a font size of 12 points. In addition, the bottom edge of the first object is determined to be 0.3 inches from the top edge of the second object. The intent is to align the left edge of both objects to the left edge of the first object, have the second object have the same type face and font size as the first, object, and to also have the two objects spaced apart by 0.2 inches. Accordingly, the Web UI ruler is searched for saved objects that possess those spatial coordinate and visual attribute values, as well as corresponding relationship values. IT found, they are applied to the second object. As a result, the second object acquires the values of the object stored in the Web UI ruler. Once the previously stored values have been applied to the target object, the process is repeated, beginning with step 416.

However, if it is determined in step 434 to not apply previously stored values to a target object, then a determination is made in step 440 whether to apply spatial coordinate and visual attribute values, and their corresponding relationship values, that were previously exported to a CSS class. If so, then a CSS class is selected in step 442, followed by selection of one or more target objects in step 444. The spatial coordinate and visual attribute values, and their corresponding relationship values, are then applied to one or more of the selected objects in step 446. As an example, multiple radio buttons in a UI are placed in a vertical column. The spacing between the radio buttons is irregular and they are not uniformly aligned. Furthermore, the radio buttons are displayed in a mixture of background colors, typefaces, and font sizes. A CSS class in selected that has the intended spatial coordinate and visual attribute values, and their corresponding relationship values, for the radio buttons. One or more of the radio buttons are then selected with a user gesture, such as a mouse click-and-drag to highlight the selected radio buttons. Once selected, the CSS class is applied, and the selected buttons acquire the spatial coordinate and visual attribute values, and their corresponding relationship values, that are contained within the selected CSS class. Once the CSS class has been applied to the selected objects in step 446, or if it is determined in step 440 to not apply a CSS class, then a determination is made in step 450 whether to continue Web UI ruler operations. If so, then, the process is repeated, beginning with step 416. Otherwise, Web UI operations are ended in step 452.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include the plural forms as well, unless the context clearly indicates otherwise, it will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations wilt be apparent to those of skill in the art without departing from the scope and spirit of the invention. The embodiment was chosen and described in order to best explain the principles of the invention and the practical application, and to enable others of skill in the art to understand the invention for various embodiments with various modifications as are suited to the particular use contemplated.

Having thus described the invention of the present application in detail and by reference to preferred embodiments thereof it will be apparent that modifications and variations are possible without departing from the scope of the invention defined in the appended claims.

What is claimed is:

1. A computer-implementable method for managing objects in a user interface (UI), comprising:
    enabling selection of a first and second object in a UI, the first and second objects comprising a first and second set of spatial coordinate values, respectively, and a first and second set of visual attribute values, respectively;
    quantifying a spatial and visual relationship between the first and second objects;
    generating quantified spatial and visual relationship values for the first and second objects, respectively, by performing comparison operations between the first and second sets of spatial coordinate and visual attribute values; and
    displaying the first and second sets of spatial coordinate and visual attribute values and respectively quantified spatial coordinate and visual attribute relationship values in a first UI ruler, the first UI ruler being operable to store the first and second sets of spatial coordinate and visual attribute values and their respectively quantified spatial coordinate and visual attribute relationship values and wherein
    the first UI ruler is operable to generate a cascading style sheet (CSS) class from the first and second sets of spatial coordinate and visual attribute values, and their respectively quantified spatial coordinate and visual attribute relationship values, stored therein.

2. The method of claim 1, further comprising:
    enabling selection of a third object in a UI, wherein the third object comprises a third set of spatial coordinate values and a third set of visual attribute values; and applying the first set of spatial coordinate and visual attribute values stored in the first UI ruler to the selected third objects, wherein the applying results in the third object acquiring the spatial coordinate and visual attribute values of the first object.

3. The method of claim 2, further comprising:
enabling selection of a fourth object in a UI, wherein the fourth object comprises a fourth set of spatial coordinate and visual attribute relationship values; and
applying the second set of spatial coordinate and visual attribute relationship values stored in the first UI ruler to the selected fourth object, wherein the applying results in the fourth object acquiring the spatial coordinate and visual attribute relationship values of the second object.

4. The method of claim 1, wherein the first UI ruler is operable to receive input to modify the first and second sets of spatial coordinate and visual attribute values, and their respectively quantified spatial coordinate and visual attribute relationship values, stored therein.

5. The method of claim 1, wherein the first UI ruler is operable to export the first and second sets of spatial coordinate and visual attribute values, and their respectively quantified spatial coordinate and visual attribute relationship values, to a second UI ruler.

6. A system comprising:
a processor;
a data bus coupled to the processor; and
a computer-usable medium embodying computer program code, the computer-usable medium being coupled to the data bus, the computer program code for managing objects in a user interface (UI) and comprising instructions executable by the processor and configured for:
enabling selection of a first and second object in a UI, the first and second objects comprising a first and second set of spatial coordinate values, respectively, and a first and second set of visual attribute values, respectively;
quantifying a spatial and visual relationship between the first and second objects;
generating quantified spatial and visual relationship values for the first and second objects, respectively, by performing comparison operations between the first and second sets of spatial coordinate and visual attribute values; and
displaying the first and second sets of spatial coordinate and visual attribute values and respectively quantified spatial coordinate and visual attribute relationship values in a first UI ruler, the first UI ruler being operable to store the first and second sets of spatial coordinate and visual attribute values and their respectively quantified spatial coordinate and visual attribute relationship values; and wherein
the first UI ruler is operable to generate a cascading style sheet (CSS) class from the first and second sets of spatial coordinate and visual attribute values, and their respectively quantified spatial coordinate and visual attribute relationship values, stored therein.

7. The system of claim 6, further comprising
enabling selection of a third object in a UI, wherein the third object comprises a third set of spatial coordinate values and a third set of visual attribute values; and
applying the first set of spatial coordinate and visual attribute values stored in the first UI ruler to the selected third objects, wherein the applying results in the third object acquiring the spatial coordinate and visual attribute values of the first object.

8. The system of claim 7, further comprising:
enabling selection of a fourth object in a UI, wherein the fourth object comprises a fourth set of spatial coordinate and visual attribute relationship values; and
applying the second set of spatial coordinate and visual attribute relationship values stored in the first UI ruler to the selected fourth object, wherein the applying results in the fourth object acquiring the spatial coordinate and visual attribute relationship values of the second object.

9. The system of claim 6, wherein the first UI ruler is operable to receive input to modify the first and second sets of spatial coordinate and visual attribute values, and their respectively quantified spatial coordinate and visual attribute relationship values, stored therein.

10. The system of claim 6, wherein the first UI ruler is operable to export the first and second sets of spatial coordinate and visual attribute values, and their respectively quantified spatial coordinate and visual attribute relationship values, to a second UI ruler.

11. A tangible computer-usable storage medium embodying computer program code, the computer program code comprising computer executable instructions configured for:
enabling selection of a first and second object in a user interface (UI), the first and second objects comprising a first and second set of spatial coordinate values, respectively, and a first and second set of visual attribute values, respectively;
quantifying a spatial and visual relationship between the first and second objects;
generating quantified spatial and visual relationship values for the first and second objects, respectively, by performing comparison operations between the first and second sets of spatial coordinate and visual attribute values; and
displaying the first and second sets of spatial coordinate and visual attribute values and respectively quantified spatial coordinate and visual attribute relationship values in a first UI ruler, the first UI ruler being operable to store the first and second sets of spatial coordinate and visual attribute values and their respectively quantified spatial coordinate and visual attribute relationship values; and wherein
the first UI ruler is operable to generate a cascading style sheet (CSS) class from the first and second sets of spatial coordinate and visual attribute values, and their respectively quantified spatial coordinate and visual attribute relationship values, stored therein.

12. The tangible computer-usable storage medium of claim 11, further comprising:
enabling selection of a third object in a UI, wherein the third object comprises a third set of spatial coordinate values and a third set of visual attribute values; and
applying the first set of spatial coordinate and visual attribute values stored in the first UI ruler to the selected third objects, wherein the applying results in the third object acquiring the spatial coordinate and visual attribute values of the first object.

13. The tangible computer-usable storage medium of claim 12, further comprising:
enabling selection of a fourth object in a UI, wherein the fourth object comprises a fourth set of spatial coordinate and visual attribute relationship values; and
applying the second set of spatial coordinate and visual attribute relationship values stored in the first UI ruler to the selected fourth object, wherein the applying results in the fourth object acquiring the spatial coordinate and visual attribute relationship values of the second object.

14. The tangible computer-usable storage medium of claim 11, wherein the first UI ruler is operable to receive input to modify the first and second sets of spatial coordinate and visual attribute values, and their respectively quantified spatial coordinate and visual attribute relationship values, stored therein.

15. The tangible computer-usable storage medium of claim 11, wherein the first UI ruler is operable to export the first and second sets of spatial coordinate and visual attribute values, and their respectively quantified spatial coordinate and visual attribute relationship values, to a second UI ruler.

16. The tangible computer-usable storage medium of claim 11, wherein the computer executable instructions are deployable to a client computer from a server at a remote location.

17. The tangible computer-usable storage medium of claim 11, wherein the computer executable instructions are provided by a service provider to a customer on an on-demand basis.

* * * * *